(12) United States Patent
Higashiyama et al.

(10) Patent No.: US 9,229,238 B2
(45) Date of Patent: Jan. 5, 2016

(54) THREE-CHIP CAMERA APPARATUS

(71) Applicant: PANASONIC CORPORATION, Osaka (JP)

(72) Inventors: Seiji Higashiyama, Fukuoka (JP); Takahisa Suzuki, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/295,596

(22) Filed: Jun. 4, 2014

(65) Prior Publication Data

US 2014/0285702 A1     Sep. 25, 2014

Related U.S. Application Data

(63) Continuation-in-part of application No. PCT/JP2012/007507, filed on Nov. 21, 2012.

(30) Foreign Application Priority Data

Dec. 9, 2011   (JP) ................................ 2011-270139

(51) Int. Cl.
*G02B 27/10* (2006.01)
*H04N 9/09* (2006.01)
*G03B 33/12* (2006.01)
*H04N 9/097* (2006.01)

(52) U.S. Cl.
CPC ............ *G02B 27/1013* (2013.01); *G03B 33/12* (2013.01); *H04N 9/09* (2013.01); *H04N 9/097* (2013.01); *H04N 2209/049* (2013.01)

(58) Field of Classification Search
CPC ..... H04N 5/2253; H04N 5/2254; H04N 9/09; H04N 9/097; H04N 2209/048; H04N 2209/049; G02B 27/1013; G03B 33/12
See application file for complete search history.

(56) References Cited

U.S. PATENT DOCUMENTS 3,202,039 A * 8/1965 Bouwhuis et al. ............ 348/265
3,802,763 A * 4/1974 Cook et al. .................... 359/633
4,268,119 A * 5/1981 Hartmann ..................... 359/634

(Continued)

FOREIGN PATENT DOCUMENTS

JP    2001-292457    10/2001
JP    2008-042465    2/2008
JP    2008-158279    7/2008

OTHER PUBLICATIONS

"Image Processor"—Wikipedia, Retrieved from https://en.wikipedia.org/wiki/Image_processor on Aug. 7, 2015.*

(Continued)

*Primary Examiner* — Timothy J Henn
(74) *Attorney, Agent, or Firm* — Greenblum & Bernstein, P.L.C.

(57) ABSTRACT

A three-chip camera apparatus includes: a color separation prism which includes an incident surface perpendicular to an optical axis, a first emission surface parallel to the incident surface, a second emission surface inclined at a first inclination angle with respect to the optical axis, and a third emission surface inclined at a second inclination angle greater than the first inclination angle; a first imaging device which is disposed in parallel to the first emission surface; a second imaging device which is disposed in parallel to the second emission surface; and a third imaging device which is disposed in parallel to the third emission surface.

4 Claims, 8 Drawing Sheets

(56) References Cited

U.S. PATENT DOCUMENTS

| | | | |
|---|---|---|---|
| 5,086,338 A * | 2/1992 | Usui | 348/263 |
| 6,144,498 A * | 11/2000 | Bryars et al. | 359/634 |
| 8,427,572 B2 | 4/2013 | Higashiyama et al. | |
| 2008/0037906 A1 * | 2/2008 | Yano et al. | 382/312 |
| 2008/0136946 A1 * | 6/2008 | Hasegawa | 348/294 |
| 2008/0239501 A1 * | 10/2008 | Saita et al. | 359/634 |
| 2010/0091148 A1 * | 4/2010 | Verkuijlen et al. | 348/294 |

OTHER PUBLICATIONS

International Search Report and Written Opionin (ISR/WO) from PCT/JP2012/007507, mail date is Dec. 18, 2012, together with an English language translation of ISR.

* cited by examiner

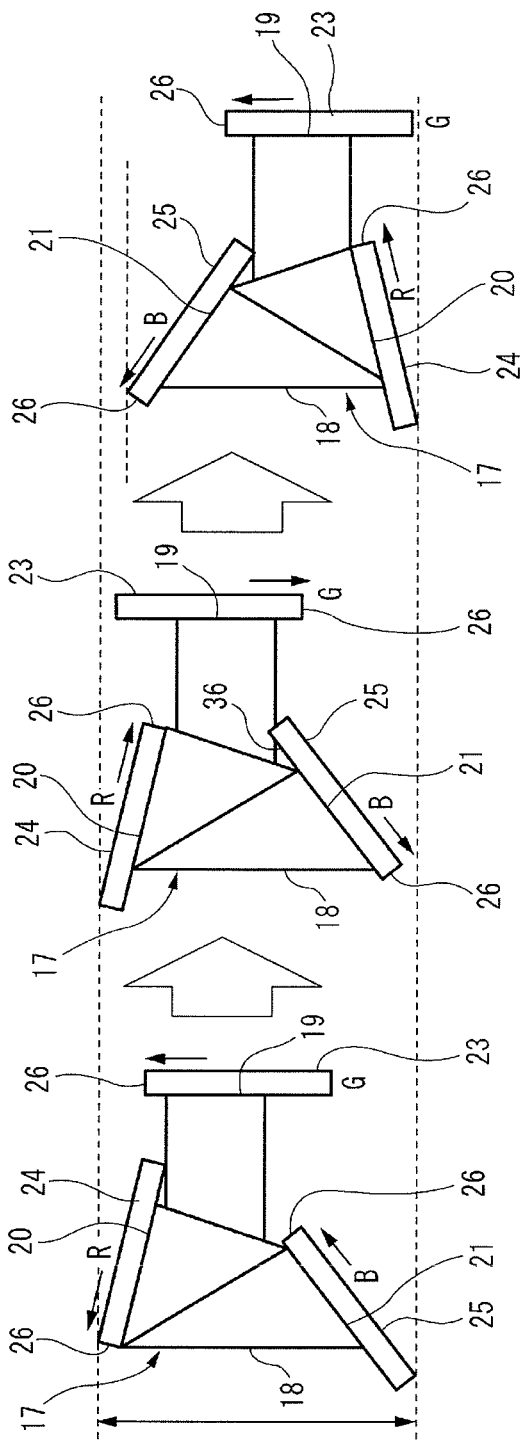

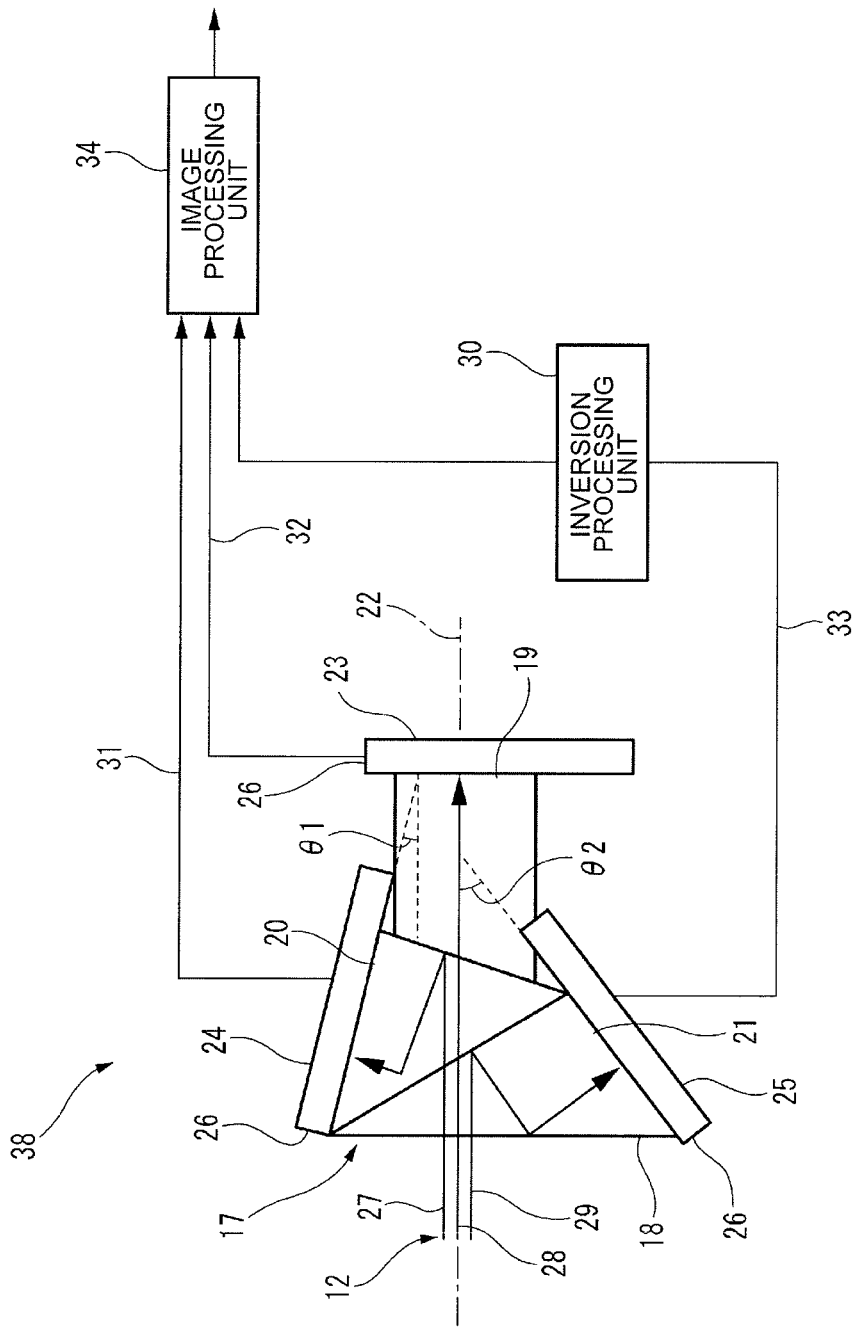

THREE-CHIP CAMERA APPARATUS

RELATED APPLICATIONS

This application is a Continuation-in-Part of International Application No. PCT/JP2012/007507, filed Nov. 21, 2012, which claims the benefit of Japanese patent application No. 2011-270139, filed Dec. 9, 2011, the disclosures of which are incorporated by reference herein in their entireties.

BACKGROUND

1. Field of the Invention

The present invention relates to a three-chip camera apparatus which is suitable for three-primary-color separation photography.

2. Description of the Related Art

In a video camera, an endoscope or the like, a three-chip camera apparatus which performs three-primary-color separation photographing using a CCD imaging device (hereinafter, referred to as a CCD) is known (for example, see JP-A-2008-42465). In the three-primary-color separation photographing, a subject is separated into components of three primary colors of red (hereinafter, referred to as R), green (hereinafter, referred to as G), and blue (hereinafter, referred to as B), the components are separately photographed, and thereafter, the three video images are synthesized as respective channel (ch) images, thereby obtaining a color video image. In order to photograph the video image in each primary color, a dichroic prism which is a color separation prism transmitting only each primary component light is used. A dichroic film in the dichroic prism separates incident light having subject information into three primary colors of light of RGB by reflection, and allows each primary color of light to be photoelectrically converted by each CCD.

SUMMARY

In recent years, an imaging device is shifted from a CCD to a CMOS (Complementary Metal-Oxide Semiconductor). Unlike the CCD which uses a dedicated manufacturing process, the CMOS can be manufactured using a general-purpose CMOS process (DRAM process or the like), hence manufacturing costs become lower compared to the CCD.

FIG. 7A is a front view showing an imaging region 101 of a CCD 100, FIG. 7B is a front view showing an imaging region 101 of a CMOS 102, and FIG. 8 is a vertical sectional view showing a main part of a three-chip camera apparatus 104 of the related art using a color separation prism 103 along with incident light 105.

In FIG. 7B and FIG. 8, each arrow in a direction along the CMOS 102 represents an upward direction.

As shown in FIG. 7B, unlike the CCD 100, a majority of CMOSs 102 have a specification in which a package center 106 and an imaging region center 107 are eccentric from each other. As shown in FIG. 8, in the three-chip camera apparatus 104, the CMOS 102 which has the imaging region center 107 eccentric from the color separation prism 103 is fixed centered on the emission surface center of each of Rch, Gch, and Bch. For this reason, a package 109 of Bch having a large inclination angle θ1 with respect to the optical axis 108 of the incident light 105 protrudes outward. In this way, in the related art, if the CMOS 102 is applied to the three-chip camera apparatus 104, a device substrate or the package 109 protrudes, and there is a problem in that the external dimension H increases.

A non-limited object of the present invention is to provide a three-chip camera apparatus capable of suppressing an increase in the external shape of the camera apparatus even if an imaging device in which a package center and an imaging region center are eccentric from each other is used.

A three-chip camera apparatus according to an aspect of the present invention includes: a color separation prism which includes an incident surface perpendicular to an optical axis, a first emission surface parallel to the incident surface, a second emission surface formed between the incident surface and the first emission surface and inclined at a first inclination angle with respect to the optical axis, and a third emission surface formed on a side opposite to the second emission surface with the optical axis interposed between the second and third emission surfaces and inclined at a second inclination angle greater than the first inclination angle with respect to the optical axis; a first imaging device which is disposed opposite to the first emission surface in parallel, the first imaging device having an imaging region, in a substantially similar shape to an outer rectangular shape of the first imaging device, which is disposed close to one side portion of the outer rectangular shape to position the one side portion at a side of the third emission surface; a second imaging device which is disposed opposite to the second emission surface in parallel, the second imaging device having an imaging region, in a substantially similar shape to an outer rectangular shape of the second imaging device, which is disposed close to one side portion of the outer rectangular shape to position the one side portion at a side of the first emission surface; and a third imaging device which is disposed opposite to the third emission surface in parallel, the third imaging device having an imaging region, in a substantially similar shape to an outer rectangular shape of the third imaging device, which is disposed close to one side portion of the outer rectangular shape to position the one side portion at a side of the incident surface.

A three-chip camera apparatus according to an aspect of the present invention includes: a color separation prism which includes an incident surface perpendicular to an optical axis, a first emission surface parallel to the incident surface, a second emission surface formed between the incident surface and the first emission surface and inclined at a first inclination angle with respect to the optical axis, and a third emission surface formed on a side opposite to the second emission surface with the optical axis interposed between the second and third emission surfaces and inclined at a second inclination angle greater than the first inclination angle with respect to the optical axis; a first imaging device which is disposed opposite to the first emission surface in parallel, the first imaging device having an imaging region, in a substantially similar shape to an outer rectangular shape of the first imaging device, which is disposed close to one side portion of the outer rectangular shape to position the one side portion at a side of the third emission surface; a second imaging device which is disposed opposite to the second emission surface in parallel, the second imaging device having an imaging region, in a substantially similar shape to an outer rectangular shape of the second imaging device, which is disposed close to one side portion of the outer rectangular shape to position the one side portion at a side of the incident surface; a third imaging device which is disposed opposite to the third emission surface in parallel, the third imaging device having an imaging region, in a substantially similar shape to an outer rectangular shape of the third imaging device, which is disposed close to one side portion of the outer rectangular shape to position the one side portion at a side of the incident surface; an image processing unit which synthesizes signals from the first imaging device, the second imaging device and the third imaging device; and an inversion processing unit which is provided between the third imaging device and the image processing unit and inverts the signal from the third imaging device vertically and horizontally.

According to the three-chip camera apparatus in the aspects of the present invention, it is possible to suppress an increase in the external shape of the camera apparatus even if an imaging device in which a package center and an imaging region center are eccentric from each other is used.

BRIEF DESCRIPTION OF THE DRAWINGS

FIG. 4A is a configuration diagram of a normal arrangement of devices, FIG. 4B is a configuration diagram in which all devices are inverted, and FIG. 4C is a configuration diagram in which the entire apparatus is inverted.

FIG. 5 is a configuration diagram of a main part of a three-chip camera apparatus according to a second embodiment.

DESCRIPTION

Figure 1:
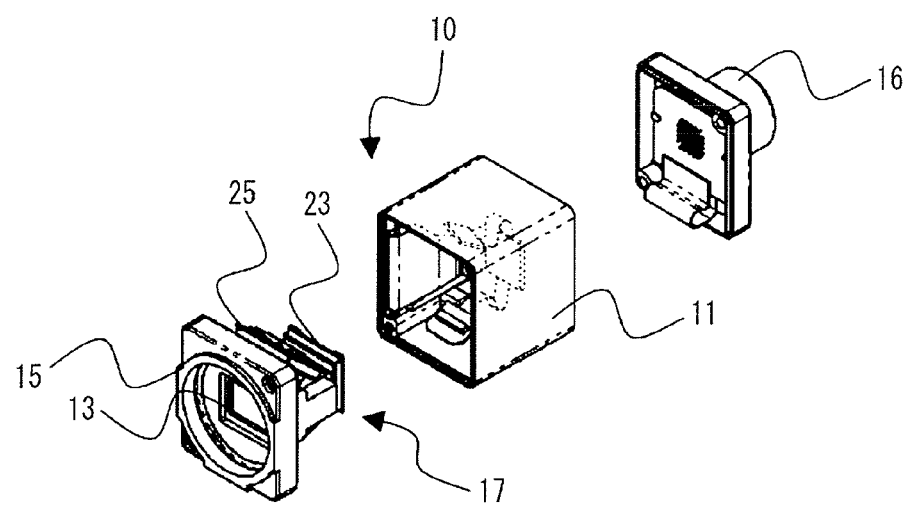
FIG. 1 is a perspective arrow view showing the inside of a three-chip camera apparatus according to the present invention.

Hereinafter, embodiments according to the present invention will be described referring to the drawings.

First Embodiment

Figure 2:
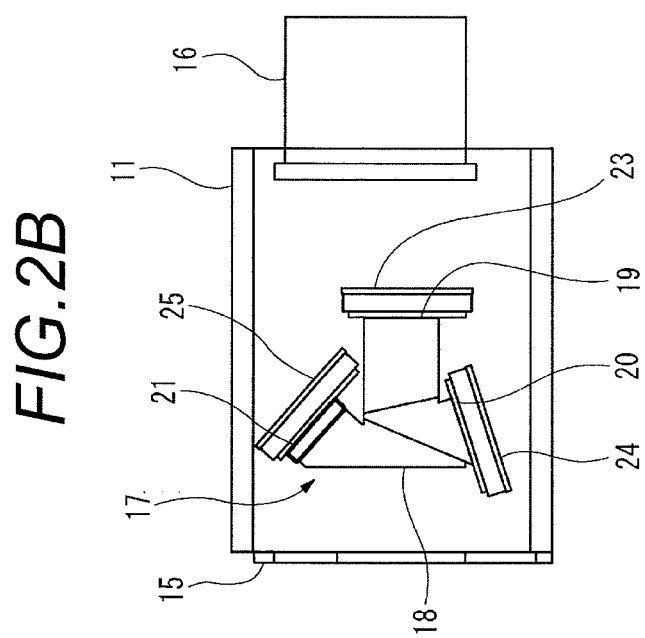
FIG. 2A is a front view of the three-chip camera apparatus shown in FIG. 1.
FIG. 2B is a side view of FIG. 2A.
Figure 3:
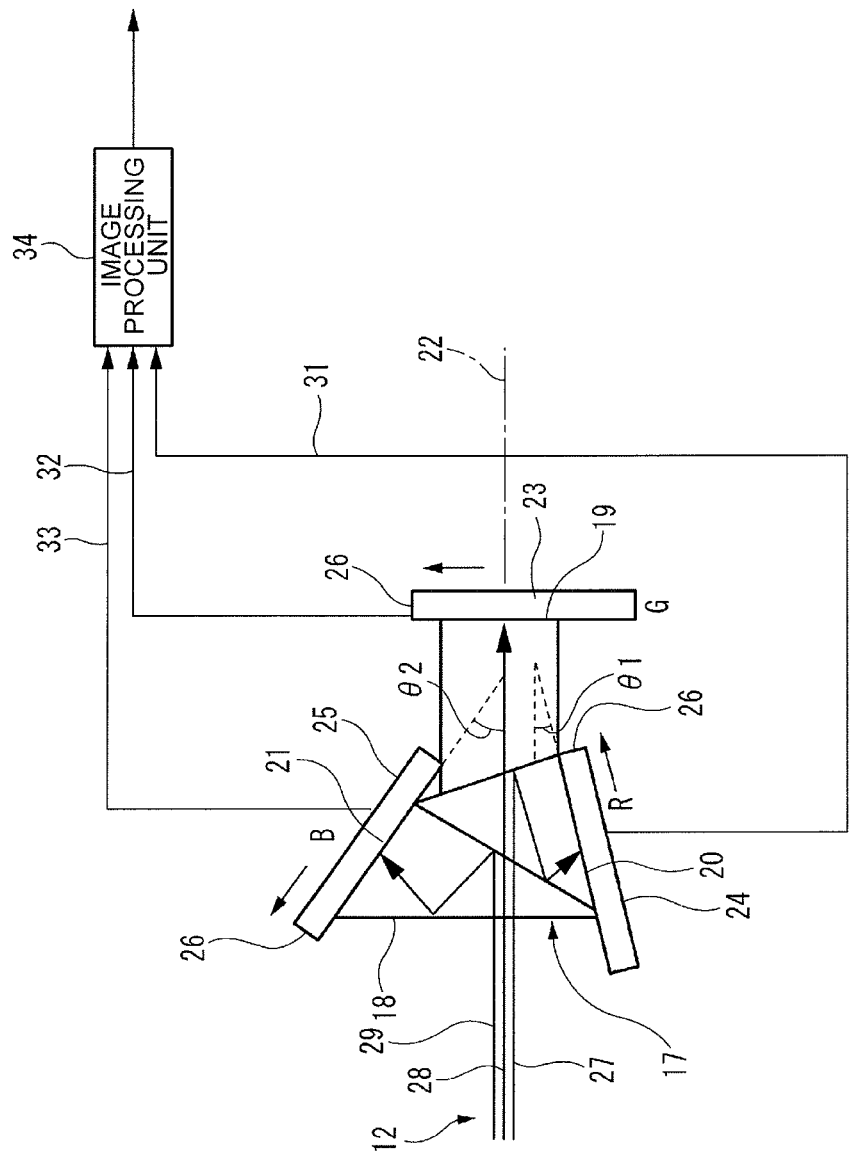
FIG. 3 is a configuration diagram of a main part of a three-chip camera apparatus according to a first embodiment.

FIG. 1 is a perspective view of the inside of a three-chip camera apparatus according to the present invention, FIG. 2A is a front view of the three-chip camera apparatus shown in FIG. 1, FIG. 2B is a side view of FIG. 2A, and FIG. 3 is a configuration diagram of a main part of a three-chip camera apparatus according to first embodiment.

A three-chip camera apparatus 10 according to the first embodiment can be preferably used in a video camera, an endoscope or the like using a CMOS. The three-chip camera apparatus 10 includes a housing 11. In the housing 11, an opening 13 is formed through which incident light 12 (see FIG. 3) having subject information is introduced. In the opening 13, an aperture stop 14 or a lens (not shown) is supported by a holder 15. The housing 11 is provided with a cable lead-out cylinder 16 on a side opposite to the opening 13.

When the lens forms a video image, an imaging region of a CMOS has a circular shape. This range is called an image circle. A quadrangular range produced inside the image circle is called an image size. The CMOS receives light within the range of the image size. The amount of received light is restricted by the aperture stop 14.

Inside the housing 11, a dichroic prism 17 which is a color separation prism is disposed on an optical axis passing through the aperture stop 14. The dichroic prism 17 separates the incident light 12 into three primary colors of light of RGB by an internal dichroic film. The dichroic film is formed by alternately arranging a high-refractive-index layer and a low-refractive-index layer in 10 to 20 layers by vacuum deposition in a sense that color is separated into two colors. Accordingly, the dichroic prism 17 reflects blue and red efficiently using different refractive indexes for the respective wavelengths of colors of light without absorbing blue and red, and allows only a specific wavelength of each of RGB to be incident on the CMOS.

The dichroic prism 17 has one incident surface 18 and three surfaces of a first emission surface 19, a second emission surface 20, and a third emission surface 21. The incident surface 18 is disposed opposite to the aperture stop 14. and the incident surface 18 is perpendicular to a cross-section (the paper surface of FIG. 3) including an optical axis 22 (see FIG. 3) and perpendicular to the optical axis 22.

Note that the cross-section is a vertical cross-section. The first emission surface 19 is formed in parallel with the incident surface 18.

The second emission surface 20 is formed between the incident surface 18 and the first emission surface 19, is perpendicular to the cross-section, and is inclined at a first inclination angle θ1 with respect to the optical axis 22. The third emission surface 21 is perpendicular to the cross-section and is formed on a side opposite to the second emission surface 20 with the optical axis 22 interposed therebetween. The third emission surface 21 is inclined at a second inclination angle θ2 greater than the first inclination angle θ1 with respect to the optical axis 22.

Figure 7A:
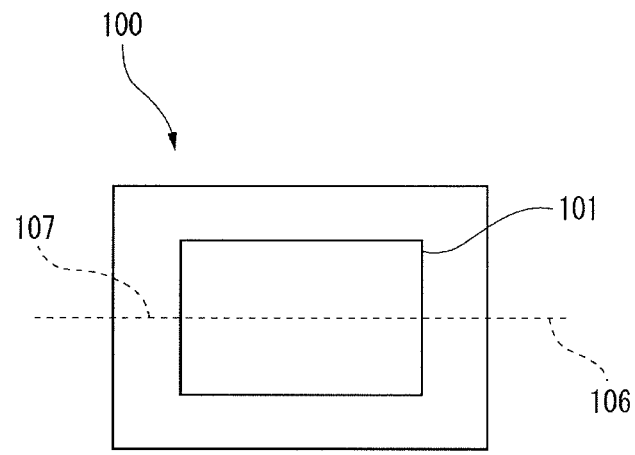
FIG. 7A is a front view showing an imaging region of a CCD.
Figure 7B:
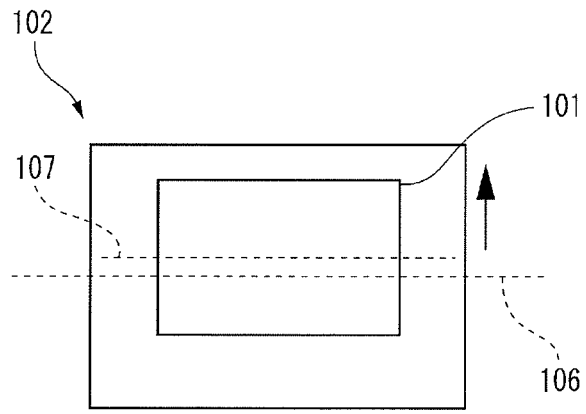
FIG. 7B is a front view showing an imaging region of a CMOS.
Figure 8:
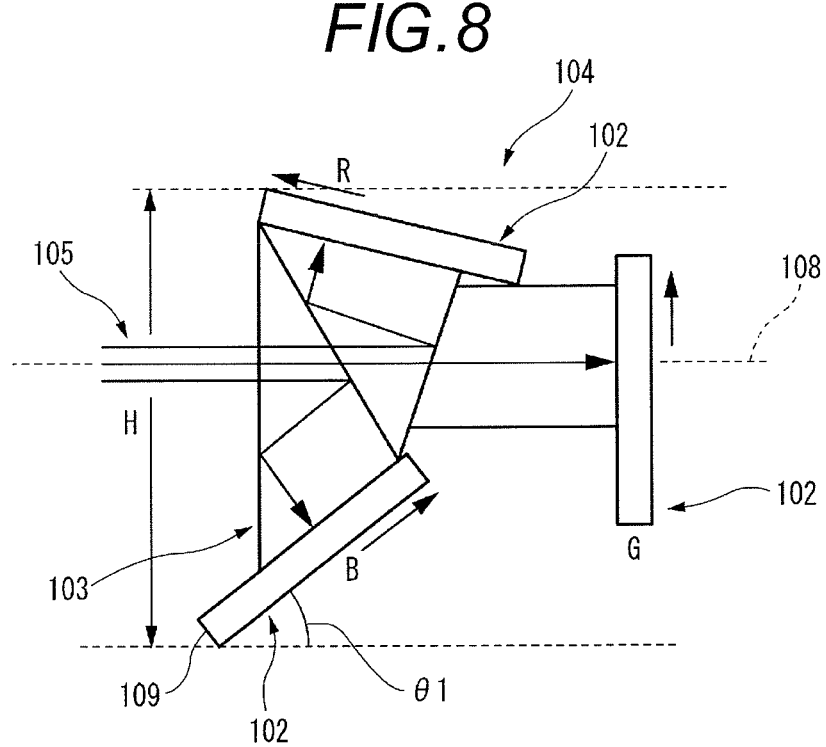
FIG. 8 is a vertical sectional view showing a main part of a three-chip camera apparatus of the related art using a color separation prism along with incident light.

A G imaging device 23 as a first imaging device, an R imaging device 24 as a second imaging device, and a B imaging device 25 as a third imaging device are respectively provided to face the first emission surface 19, the second emission surface 20, and the third emission surface 21. All the G imaging device 23, the R imaging device 24, and the B imaging device 25 are made of CMOSs. Each of the imaging devices is configured in common such that an imaging region 101 (see FIG. 7B) having a substantially similar shape to an outer rectangular shape of the imaging device is disposed close to one side portion 26 of the outer rectangular shape. That is, the package center and the imaging region center are eccentric from each other.

As shown in FIG. 3, the G imaging device 23 is disposed opposite to the first emission surface 19 in parallel such that one side portion 26 positions at the third emission surface 21 side. The R imaging device 24 is disposed opposite to the second emission surface 20 in parallel such that one side portion 26 positions at the first emission surface 19 side. The B imaging device 25 is disposed opposite to the third emission surface 21 in parallel such that one side portion 26 positions at the incident surface 18 side.

The G imaging device 23, the R imaging device 24, and the B imaging device 25 respectively convert R light 27, G light 28, and B light 29 of three primary colors of R, G, and B having subject information to electrical signals, and send the electrical signals to an image processing unit 34 as an R signal 31, a G signal 32, and a B signal 33.

The image processing unit 34 performs y processing on signals obtained by performing WB control for the input R signal 31, G signal 32, and B signal 33, forms a luminance signal and a color difference signal, converts these luminance signal and color difference signal in a format appropriate for a video signal, and outputs the converted signals.

Next, the action of the three-chip camera apparatus 10 having the above-described configuration will be described.

FIG. 4A is a configuration diagram of a normal arrangement of devices, FIG. 4B is a configuration diagram in which all devices are inverted, and FIG. 4C is a configuration diagram in which the entire apparatus is inverted and is the configuration shown in FIG. 3.

In FIGS. 3 and 4A to 4C, an arrow in a direction along a CMOS represents an upward direction.

In the three-chip camera apparatus 10, the G imaging device 23, the R imaging device 24, and the B imaging device 25 are configured such that the imaging region having a substantially similar shape to the outer rectangular shape is close to one side portion 26 of the outer rectangular shape and the imaging region center is eccentric from the package center.

Here, the R imaging device 24 and the B imaging device 25 are disposed with the optical axis 22 of the incident light 12 interposed therebetween, and the second inclination angle θ2 of the B imaging device 25 with respect to the optical axis 22 is greater than the first inclination angle θ1 of the R imaging device 24 with respect to the optical axis 22. If the direction of the R imaging device 24 is rotated by 180 degrees to match the imaging region center of the R imaging device 24 and the emission surface center of Rch, one side portion 26 is disposed on a side (on the right side of FIG. 3) of an included angle between the R imaging device 24 and the optical axis 22.

Similarly to the R imaging device 24, if the direction of the B imaging device 25 is rotated by 180 degrees to match the imaging region center of the B imaging device 25 and the emission surface center of Bch, one side portion 26 is disposed on a side (the left side of FIG. 3) opposite to an included angle between the B imaging device 25 and the optical axis 22.

In the same manner as the R imaging device 24 and the B imaging device 25, in the G imaging device 23, one side portion 26 is disposed on the lower side of FIG. 3.

As shown in FIG. 4B, the B imaging device 25 which is inclined at the large second inclination angle θ2 is disposed such that a frame edge portion 36 which increases in width with an eccentric imaging region is deviated from the third emission surface 21 and protrudes in an extension surface direction on a side of an included angle between the third emission surface 21 and the optical axis 22. That is, in the three-chip camera apparatus 10, the B imaging device 25 having the large second inclination angle θ2 is disposed not to protrude from the R imaging device 24 having the small first inclination angle θ1.

In this arrangement, the directions of the imaging devices are inverted vertically and horizontally.

As shown in FIG. 4C, the thus-produced vertical and horizontal inversion of the signal is returned to the original state by finally inverting the entire apparatus. Accordingly, the package of the B imaging device 25 having the large second inclination angle θ2 with respect to the optical axis 22 does not protrude outward, and an increase in the external dimension H of the entire device is suppressed.

The direction of the dichroic prism 17 shown in FIGS. 1, 2A, and 2B is as shown in FIG. 4C after inversion. The direction of the dichroic prism 17 shown in FIG. 3 is as shown in FIG. 4B before inversion.

In the first embodiment, although the entire apparatus is inverted to the direction of a video image to be output to the original state, the video image may be returned to the original state by changing the reading order in the image processing unit 34, or the like.

Second Embodiment

Next, a three-chip camera apparatus 38 according to a second embodiment will be described.

FIG. 5 is a configuration diagram of a main part of the three-chip camera apparatus according to the second embodiment.

The same members as the members shown in FIG. 1 to FIGS. 4A, 4B, and 4C are represented by the same reference numerals and signs, and overlapping description will not be repeated.

In the three-chip camera apparatus 38 according to the second embodiment, the dichroic prism 17 is the same as that of the three-chip camera apparatus 10. The G imaging device 23 is disposed opposite to the first emission surface 19 in parallel such that one side portion 26 positions at the second emission surface side. The R imaging device 24 is disposed opposite to the second emission surface 20 in parallel such that one side portion 26 positions at the incident surface side. The B imaging device 25 is disposed opposite to the third emission surface 21 in parallel such that one side portion 26 positions at the incident surface side. That is, only the B imaging device 25 is inverted.

The image processing unit 34 which synthesizes the R signal 31, the G signal 32, and the B signal 33 is connected to the G imaging device 23, the R imaging device 24, and the B imaging device 25. An inversion processing unit 30 is provided between the B imaging device 25 and the image processing unit 34, and the inversion processing unit 30 inverts the B signal 33 from the B imaging device 25 vertically and horizontally.

Next, the action of the three-chip camera apparatus 38 having the above-described configuration will be described.

Figures 6A, 6B:
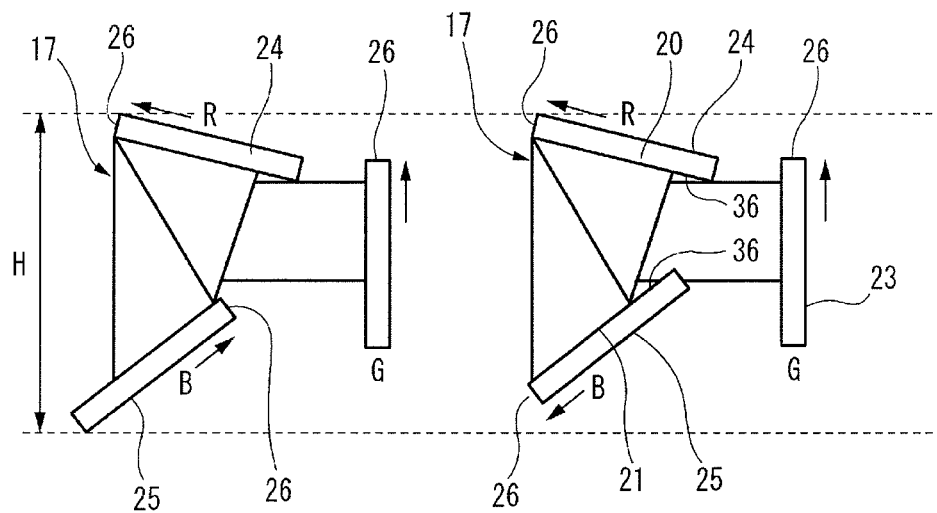
FIG. 6A is a configuration diagram of a normal arrangement of devices.
FIG. 6B is a configuration diagram in which only a B imaging device is inverted.

FIG. 6A is a configuration diagram of a normal arrangement of devices, and FIG. 6B is a configuration diagram in which only the B imaging device 25 is inverted.

In the three-chip camera apparatus 38, as shown in FIG. 6B, the R imaging device 24 is configured such that one side portion 26 is disposed on a side (the left side of FIG. 6B) opposite to an included angle between the R imaging device 24 and the optical axis 22. The B imaging device 25 is also configured such that one side portion 26 is disposed on a side (the left side of FIG. 6B) opposite to an included angle between the B imaging device 25 and the optical axis 22.

As shown in FIG. 6B, the R imaging device 24 which is inclined at a small first inclination angle θ1 is disposed such that a frame edge portion 36 which increases in width with an eccentric imaging region is deviated from the second emission surface 20 and protrudes in an extension surface direction on a side of an included angle between the second emission surface 20 and the optical axis 22. The B imaging device 25 which is inclined at a large second inclination angle θ2 is also disposed such that a frame edge portion 36 which increases in width with an eccentric imaging region is deviated from the third emission surface 21 and protrudes in an extension surface direction on a side of an included angle between the third emission surface 21 and the optical axis 22. That is, both the R imaging device 24 and the B imaging device 25 protrude in a direction such that the external dimension H does not increase.

As shown in FIG. 5, the thus-produced vertical and horizontal inversion of the signal of only the B imaging device 25 is inverted by the inversion processing unit 30 and returned to the original state. Accordingly, the packages of both the R imaging device 24 and the B imaging device 25 do not protrude outward, and an increase in the external dimension H of the entire apparatus is suppressed.

Therefore, according to the three-chip camera apparatus 10 and the three-chip camera apparatus 38 of the second embodiment, it is possible to suppress an increase in the external shape of the apparatus even if an imaging device in which a package center and an imaging region center are eccentric from each other is used.

In particular, when performing a surgical operation using the three-chip camera apparatus 10 of the present invention as an endoscope, since an assistant who supports the surgical operation holds the three-chip camera apparatus 10 with his/her hands for a long time, it is important for a user that the device is as small as possible.

When the three-chip camera apparatus 10 of the present invention is provided as a module for a surgical microscope, since a surgeon performs a surgical operation while looking in the surgical microscope, reduction in size of the three-chip camera apparatus 10 results in reduction in size of the surgical microscope, and easiness in performing the surgical operation is achieved.

The present invention is useful for a three-chip camera apparatus which is used in a video camera, an endoscope, or the like.

The present application is a continuation-in-part of PCT application No. PCT/JP2012/007507 filed on Nov. 21, 2012, claiming the benefit of Japanese patent application No. 2011-270139 filed on Dec. 9, 2011, the contents of which are incorporated herein by reference in its entirety.

What is claimed is:

1. A three-chip camera apparatus comprising:
   a color separation prism that includes an incident surface perpendicular to an optical axis, a first emission surface parallel to the incident surface, a second emission surface positioned between the incident surface and the first emission surface along a direction of the optical axis and inclined at a first inclination angle with respect to the optical axis, and a third emission surface positioned on a side opposite to the second emission surface with the optical axis interposed between the second and third emission surfaces and inclined at a second inclination angle greater than the first inclination angle with respect to the optical axis;
   a first imaging device that has a first surface extending in parallel to the first emission surface, a center of a first imaging region of the first imaging device being offset from a center of the first surface so that the center of the first imaging region is positioned between the center of the first surface and a first part of an outer shape of the first surface, the first part being closer to the third emission surface than to the second emission surface;
   a second imaging device that has a second surface extending in parallel to the second emission surface, a center of a second imaging region of the second imaging device being offset from a center of the second surface so that the center of the second imaging region is positioned between the center of the second surface and a second part of an outer shape of the second surface, the second part being closer to the first emission surface than to the incident surface; and
   a third imaging device that has a third surface extending in parallel to the third emission surface, a center of a third imaging region of the third imaging device being offset from a center of the third surface so that the center of the third imaging region is positioned between the center of the third surface and a third part of an outer shape of the third surface, the third part being closer to the incident surface than to the first emission surface.

2. The three-chip camera apparatus according to claim 1, wherein each of the first surface, the second surface, third surface, the first imaging region, the second imaging region and the third imaging region has a rectangular shape.

3. A three-chip camera apparatus comprising:
   a color separation prism that includes an incident surface perpendicular to an optical axis, a first emission surface parallel to the incident surface, a second emission surface positioned between the incident surface and the first emission surface along a direction of the optical axis and inclined at a first inclination angle with respect to the optical axis, and a third emission surface positioned on a side opposite to the second emission surface with the optical axis interposed between the second and third emission surfaces and inclined at a second inclination angle greater than the first inclination angle with respect to the optical axis;
   a first imaging device that has a first surface extending in parallel to the first emission surface, a center of a first imaging region of the first imaging device being offset from a center of the first surface so that the center of the first imaging region is positioned between the center of the first surface and a first part of an outer shape of the first surface, the first part being closer to the second emission surface than to the third emission surface;
   a second imaging device that has a second surface extending in parallel to the second emission surface, a center of a second imaging region of the second imaging device being offset from a center of the second surface so that the center of the second imaging region is positioned between the center of the second surface and a second part of an outer shape of the second surface, the second part being closer to the incident surface than to the first emission surface;
   a third imaging device that has a third surface extending in parallel to the third emission surface, a center of a third imaging region of the third imaging device being offset from a center of the third surface so that the center of the third imaging region is positioned between the center of the third surface and a third part of an outer shape of the third surface, the third part being closer to the incident surface than to the first emission surface;
   an image processor that synthesizes signals from the first imaging device, the second imaging device and the third imaging device; and
   an inversion processor that is provided between the third imaging device and the image processor and inverts the signal from the third imaging device vertically and horizontally.

4. The three-chip camera apparatus according to claim 3, wherein each of the first surface, the second surface, third surface, the first imaging region, the second imaging region and the third imaging region has a rectangular shape.

* * * * *